Patented Dec. 10, 1935

2,024,095

UNITED STATES PATENT OFFICE 2,024,095

HALOGENATED ACYCLIC HYDROCARBON CONTAINING FLUORINE

Herbert Wilkens Daudt and Mortimer Alexander Youker, Wilmington, Del., and Harry Howard Reynolds, Pennsgrove, N. J., assignors to Kinetic Chemicals, Inc., Wilmington, Del., a corporation of Delaware No Drawing. Application June 20, 1933, Serial No. 676,760. Renewed April 8, 1935

14 Claims. (Cl. 260—162)

This invention relates to organic fluorine compounds, more particularly fluorinated acyclic hydrocarbon derivatives, and a process for the production thereof.

Fluorinated acyclic hydrocarbons may be produced by the fluorination of halogenated acyclic hydrocarbons containing halogens other than fluorine with hydrogen fluoride in the presence of an antimony halide. The products obtained normally contain various proportions of fluorine. In the development of commercial processes for producing fluorinated derivatives, it is highly important to decrease the proportions of products that contain more fluorine or less fluorine than the desired material. It is particularly desirable to minmize the production of fluorinated derivatives for which there may be no commercial application. For instance, in the production of difluoro-dichloro methane by passing hydrogen fluoride into carbon tetrachloride in contact with an antimony halide, the reaction gases normally contain some of each of the products: fluorotrichloro methane, difluoro-dichloro methane and trifluoro-chloro methane. It is ordinarily of advantage to produce as little of the trifluoro-chloro methane as possible and to avoid, as for as possible, the re-working of fluoro-trichloro methane and unconsumed carbon tetrachloride.

It is an object of the present invention to provide a new and improved process for the manufacture of fluorinated acyclic hydrocarbons. A further object is to provide a new and improved process for the production of fluoro-chloro methanes. Other objects will appear hereinafter.

These objects are accomplished according to the present invention whereby in the fluorination of a halogenated acyclic hydrocarbon containing a halogen other than fluorine, with hydrogen fluoride in the presence of an antimony halide the process is characterized by the maintenance of a controlled and constant fluorine content of the catalyst.

While the invention is susceptible to considerable variation and modification in the manner of its practical application, particularly as regards the proportions of materials, temperatures, pressures and the exact method of procedure, the following examples, in which the parts are by weight, will serve to illustrate how it may be practised.

*Example I—The production of fluoro-dichloro methane*

A mixture of 2000 parts of antimony pentachloride and 750 parts of antimony trichloride was treated with 60 parts of substantially anhydrous hydrogen fluoride. The temperature was raised to 65° C. to 75° C. and maintained within this range throughout the remainder of the operation. Subsequently, chloroform and additional hydrogen fluoride were added at the respective rates of 125 parts and 20 parts per hour. The fluorine content of the catalyst was determined periodically. So long as the fluorine content lay within the range of 2% to 4%, no changes in feed of the materials were made. When the fluorine content exceeded 4%, the hydrogen fluoride feed was temporarily decreased until the fluorine content lay within the proper range If the content was below 2%, the chloroform feed was temporarily decreased.

The condensed product consisted of a mixture of approximately 70% fluoro-dichloro methane, 20% chloroform and 10% difluoro-chloro methane. The recovered chloroform was fed back to the system. The yield of fluorinated products was approximately 90%.

*Example II—The production of difluoro-chloro methane*

A mixture of 2000 parts of antimony pentachloride and 750 parts of antimony trichloride was heated to 65° C. to 75° C., and 200 parts of hydrogen fluoride were added. While maintaining this temperature, there were added chloroform and additional hydrogen fluoride at the respective rates of 125 parts and 40 parts per hour. The fluorine content was kept within the range of 8% to 12% (based on the weight of the antimony halide) by varying the feed of hydrogen fluoride or chloroform.

The condensed product consisted of a mixture of approximately 50% difluoro-chloro methane, 45% fluoro-dichloro methane and 5% chloroform. The combined yield of fluorinated products was approximately 90%. The unconsumed chloroform and, if desired, the fluoro-dichloro methane were fed back to the system, proper adjustment being made in the hydrogen fluoride feed.

*Example III—The production of difluoro-dichloro methane*

Hydrogen fluoride was added to a mixture of 2550 parts of antimony pentachloride and 250 parts of antimony trichloride until the fluorine content of the mixture was within the range of 6% to 10%. The mixture was heated to 60° C. to 65° C., which temperature was maintained throughout the remainder of the operation. Subsequently, carbon tetrachloride and additional hydrogen fluoride were fed at the respective rates of about 160 parts and 40 parts per hour, unless the fluorine content of the antimony halide mixture was outside the above range. Whenever the fluorine content came outside the desired range, the feed of hydrogen fluoride was increased or decreased until the proper adjustment of the antimony halide catalyst had taken place, after which the normal rates of feed were maintained.

The product consisted primarily of a mixture of about 80% difluoro-dichloro methane and 20% fluoro-trichloro methane. The boiling point of the product was usually below —20° C.

A slightly less uniform product was obtained by maintaining the fluorine content in the less restricted range of 4% to 13%. This roughly corresponds to the use of a catalyst, in which the value of $x$ in a pentavalent halide represented empirically by $$SbF_xCl_{5-x}$$

lies between about 0.5 and 2.0. The more restricted range, 6% to 10% fluorine, roughly corresponds to a value of 0.9 to 1.5 for $x$.

The fluorination reaction described in the examples, wherein the catalyst has a controlled fluorine content, is generally applicable to the treatment of halogenated acyclic hydrocarbons containing halogens other than fluorine. As specific examples of such compounds may be mentioned carbon tetrachloride, chloroform, methylene chloride, hexachloro ethane, pentachloro ethane, tetrachloro ethane, dichloro ethane, ethyl chloride, dichloro ethylene, trichloro ethylene, perchloro ethylene, ethylene-dibromide, tribromo ethane, tetrachloro butane, allyl bromide, hexachloro hexylene, allyl iodide and tetrabromo butane. In general, the reaction has been particularly valuable for the production of fluoro-chloro acyclic hydrocarbon derivatives, particularly fluoro-chloro methanes, by the reaction of hydrogen fluoride with a halogenated acyclic hydrocarbon containing a halogen other than fluorine, in the presence of an antimony chloride catalyst. By the use of an antimony bromide catalyst for brominated acyclic hydrocarbon derivatives, fluoro-bromo acyclic hydrocarbon derivatives may be produced. It will be understood, however, that, in general, the substitution of chlorine by fluorine in the halogenated acyclic hydrocarbons is more difficult than the replacement of bromine or iodine by fluorine and that, therefore, the optimum conditions for the fluorination of the bromine or iodine derivatives may be somewhat less severe than those employed in the substitution of chlorine by fluorine.

A free halogen may be present or may be added during the fluorination reaction. The free halogen tends to preserve the antimony halide catalyst in pentavalent form. It may also halogenate the hydrocarbon raw material, e. g., by addition to unsaturated hydrocarbons or by replacement of hydrogen with halogen.

The hydrogen fluoride may be introduced into the reaction zone either in liquid or gaseous form. By the term "hydrogen fluoride" it is intended to include and to cover not only the pure product but also hydrogen fluoride or hydrofluoric acid which may contain small amounts of impurities, as, for example, water.

The antimony halide catalysts preferably used in accordance with the invention are pentavalent antimony halides or mixtures thereof with antimony trihalides. Especially desirable results have been obtained in the use of pentavalent antimony halides represented empirically by $$SbF_xHal_{5-x}$$

in which Hal represents a halogen other than fluorine, and $x$ is a positive value less than 3. In general, the presence of antimony trihalides is desirable in that it tends to prevent dissociation of the catalyst.

The control of the fluorine content of the catalyst may be carried out by means of suitable chemical analysis. If desired, a physical test, such as that of the melting temperature or congealing temperature, may be used. The effect of the controlled fluorine content upon the products obtained is illustrated by the examples. For the production of monofluoro-chloro methanes, as illustrated, for instance, in Example I, it is preferable to employ a pentavalent antimony fluoro-chloride catalyst having a fluorine content within the range of about 1% to about 4%. For the production of difluoro-dichloro methane, as illustrated, for instance, in Example III, it is preferable to employ a pentavalent antimony fluoro-chloride catalyst having a fluorine content within the range of about 6% to about 10%. The antimony fluoro-chloride catalysts employed as described in the examples were, in general, liquid at the temperatures used. The fluidities of the catalyst at temperatures below 65° C. may be decreased to an undesirable degree by the presence of higher proportions of fluorine. This advantage may be overcome by the use of higher temperatures which may, however, increase the fluorination of the products to an undesirable degree. In general, for the production of fluorinated methanes and ethanes containing two fluorine atoms or less, it has been found advantageous to use a catalyst which melts within a range, the maximum of which is 15° C. lower and the minimum of which is 45° C. lower than the operating temperature of the catalyst. For instance, in the production of difluoro-dichloro methane, the antimony fluorochloride catalyst, having a fluorine content within the range of about 6% to about 10%, melts within the temperature range of about 15° C. to about 45° C.

The temperature of the fluorination reaction zone may be varied within relatively wide limits. The reaction may take place actively at ordinary temperatures and appreciably so at temperatures of approximately 0° C. For the production of halogenated methanes containing not more than two atoms of fluorine, the preferred temperature range lies between about 45° C. and 95° C. At these temperatures desirable results have also been obtained in the production of fluoro-pentachloro ethane, difluoro-tetrachloro ethane and moderate amounts of trifluoro-trichloro ethane by the fluorination of hexachloro ethane with hydrogen fluoride in the presence of pentavalent antimony fluorochloride catalysts of the types described above.

The pressure may vary within relatively wide limits but should preferably be such as to maintain the reaction mixture in liquid phase under the temperature conditions used and at the same time allow gaseous fluorinated products to vaporize and escape from the reaction zone.

The fluorinated products may be isolated in any suitable manner. In the procedures described in the examples, the reaction products are gases; they were ordinarily passed through an aqueous solution of sodium hydroxide to remove acidic gases. They were then dried by passing them through concentrated sulfuric acid after which they were condensed. The reaction and separation or isolation of the products by distillation, fractional or otherwise, may be carried out simultaneously or in separate steps.

In the production of compounds having relatively high boiling points, or compounds which may be decomposed at temperatures below the temperatures at which they vaporize, it will be recognized that the reaction products may not be recovered in the form of gases, as described in the examples, but will be recovered directly in liquid or solid form from the reaction mixture. A solvent may or may not be used in the recovery.

The invention is valuable in that it provides an improvement in fluorination processes whereby certain fluorinated products may be produced without, at the same time, producing large amounts of other fluorinated products which have no commercial application, or which may have to be further processed.

As many apparently widely different embodiments of this invention may be made without departing from the spirit and scope thereof, it is to be understood that we do not limit ourselves to the specific embodiments thereof except as described in the following claims.

We claim:

1. In a process of producing fluorinated acyclic hydrocarbon derivatives by fluorination of a halogenated acyclic hydrocarbon containing a halogen other than fluorine, in the presence of an antimony halide containing fluorine, the improvement which comprises maintaining a controlled and substantially constant fluorine content in the antimony halide.

2. The process of claim 1 in which the halogenated acyclic hydrocarbon containing a halogen other than fluorine is a halogenated acyclic hydrocarbon containing at least three atoms of halogens other than fluorine.

3. The process of claim 1 in which the halogenated acyclic hydrocarbon containing a halogen other than fluorine is a halogenated methane.

4. The process of claim 1 in which the halogenated acyclic hydrocarbon containing a halogen other than fluorine is a halogenated ethane.

5. In a process of producing a fluorinated methane by reacting hydrogen fluoride and a chloro-methane containing at least three atoms of chlorine, in the presence of an antimony halide containing fluorine, the improvement which comprises maintaining a controlled and substantially constant fluorine content in the antimony halide.

6. In a process of producing difluoro-dichloro methane by passing hydrogen fluoride and carbon tetrachloride into an antimony halide containing fluorine, the improvement which comprises maintaining a controlled and substantially constant fluorine content in the antimony halide.

7. A continuous process of producing difluorodichloro methane which comprises passing substantially anhydrous hydrogen fluoride and carbon tetrachloride into a pentavalent antimony fluorochloride, effecting the fluorination reaction in liquid phase while maintaining a controlled and substantially constant fluorine content of the antimony fluorochloride, and continuously removing the evolved difluoro-dichloro methane.

8. The process of producing a fluorinated methane which comprises reacting hydrogen fluoride and a chloro methane containing at least three chlorine atoms, in the presence of an antimony fluorochloride in which the antimony is present principally in pentavalent form, and maintaining a controlled and substantially constant fluorine content of the antimony halide between about 1% and about 4% fluorine.

9. The process of producing a fluorinated methane which comprises reacting hydrogen fluoride and a chloro methane containing at least three chlorine atoms, in the presence of an antimony fluorochloride in which the antimony is present principally in pentavalent form, and maintaining a controlled and substantially constant fluorine content of the antimony halide between about 4% and about 13% fluorine.

10. The process of producing difluoro-dichloro methane which comprises reacting hydrogen fluoride and carbon tetrachloride in the presence of an antimony fluorochloride in which the antimony is present principally in the pentavalent form, and maintaining a controlled and substantially constant fluorine content of the antimony halide between about 6% and about 10% fluorine.

11. The process of producing difluoro-dichloro methane which comprises passing substantially anhydrous hydrogen fluoride and carbon tetrachloride into an antimony fluorochloride in which the antimony is present principally in pentavalent form, said catalyst being maintained at a temperature within the range of about 45° C. to about 95° C., and maintaining a controlled and substantially constant fluorine content of the antimony fluorochloride between about 4% and about 13% fluorine.

12. A continuous process of producing difluorodichloro methane which comprises passing substantially anhydrous hydrogen fluoride and carbon tetrachloride into an antimony fluorochloride in which the antimony is present principally in pentavalent form, effecting the fluorination reaction in liquid phase at a temperature within the range of about 45° C. to about 95° C., while maintaining a controlled and substantially constant fluorine content of the antimony fluorochloride such that the melting point of the antimony fluorochloride is not less than about 15° C. and not more than about 45° C., and continuously removing the evolved difluoro-dichloro methane.

13. The process of producing monofluorodichloro methane which comprises passing substantially anhydrous hydrogen fluoride and chloroform into an antimony fluorochloride in which the antimony is present principally in pentavalent form, maintaining a temperature within the range of about 45° C. to about 95° C., and maintaining a controlled and substantially constant fluorine content of the antimony halide between about 1% and about 4% fluorine.

14. In a process of producing halogenated acyclic hydicarbons containing fluorine and having less than three carbon atoms by fluorination of a halogenated acyclic hydrocarbon containing at least one halogen atom other than fluorine and having less than three carbon atoms, in the presence of an antimony halide containing fluorine, the improvement which comprises maintaining a controlled and substantially constant fluorine content in the antimony halide.

HERBERT WILKENS DAUDT.
MORTIMER ALEXANDER YOUKER.
HARRY HOWARD REYNOLDS.

CERTIFICATE OF CORRECTION.

Patent No. 2,024,095.

December 10, 1935.

HERBERT WILKENS DAUDT, ET AL.

It is hereby certified that error appears in the printed specification of the above numbered patent requiring correction as follows: Page 1, first column, line 16, for "minmize" read minimize; line 26, for "for" read far; second column, line 3-4, for "withirg" read within; page 2, second column, line 33-34, for "advantage" read disadvantage; Page 3, second column, line 62, claim 14, for "hydicarbons" read hydrocarbons; and that the said Letter Patent should be read with these corrections therein that the same may conform to the record of the case in the Patent Office.

Signed and sealed this 18th day of February, A. D. 1936.

Leslie Frazer
Acting Commissioner of Patents.

(Seal)